United States Patent
Harding et al.

(10) Patent No.: US 6,367,063 B1
(45) Date of Patent: Apr. 2, 2002

(54) METHOD AND APPARATUS FOR SELECTIVELY PERFORMING A PLURALITY OF LOGIC OPERATIONS AND MEMORY FUNCTIONS

(75) Inventors: John A. Harding, Pico Rivera; David A. Schwartz, Moorpark; Lap-Wai Chow, South Pasadena, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/019,069

(22) Filed: Feb. 5, 1998

(51) Int. Cl.[7] ......................... C06F 17/50; H03K 17/693
(52) U.S. Cl. .............................. 716/16; 716/17; 326/39
(58) Field of Search ..................... 395/500.17; 716/16, 716/17; 326/39

(56) References Cited

U.S. PATENT DOCUMENTS

| | | | | |
|---|---|---|---|---|
| 4,761,733 A | * | 8/1988 | McCrocklin et al. | 364/200 |
| 5,426,378 A | * | 6/1995 | Ong | 326/39 |
| 5,444,853 A | * | 8/1995 | Lentz | 395/250 |
| 5,596,742 A | * | 1/1997 | Agarwal et al. | 395/500 |
| 5,640,327 A | * | 6/1997 | Ting | 364/488 |
| 5,649,230 A | * | 7/1997 | Lentz | 395/872 |
| 5,742,180 A | * | 4/1998 | DeHon et al. | 326/40 |
| 5,815,701 A | * | 9/1998 | Slavenburg | 395/591 |
| 5,949,994 A | * | 9/1999 | Dupree et al. | 395/569 |
| 5,956,518 A | * | 9/1999 | DeHon et al. | 395/800.15 |
| 6,009,499 A | * | 12/1999 | Koppala | 711/132 |
| 6,081,849 A | * | 6/2000 | Born et al. | 710/7 |
| 6,163,840 A | * | 12/2000 | Chysos et al. | 712/227 |
| 6,175,247 B1 | * | 1/2001 | Scalera et al. | 326/39 |

OTHER PUBLICATIONS

S.M. Scalera et al., The Design and Implementation of a Context Switching FPGA, IEEE Symposium on FPGAs for Custom Computing Machines, pp. 78–85, Apr. 1998.*

T. Korpiharju et al., TUTCA configurable logic cell array architecture, IEEE International ASIC Conference and Exhibit, pp. 3–3/1–4, Sep. 1991.*

B.K. Fawcett, Taking Advantage of Reconfigurable Logic, IEEE International ASIC Conference and Exhibit, pp. 227–230, Sep. 1991.*

D. Chen et al., A Reconfigurable Multiprocessor IC for Rapid Prototyping of Algorithmic–Specific High–Speed DSP Data Paths, IEEE Journal of Solid–State Circuits, pp. 1895–1904, Sep. 1991.*

Andre DeHon, "DPGA–Coupled Microprocessors: Commodity ICs for the Early $21^{st}$ Century", MIT Transit Project Technical Report, Jan. 1994.

(List continued on next page.)

*Primary Examiner*—Matthew Smith
*Assistant Examiner*—A. M. Thompson
(74) *Attorney, Agent, or Firm*—V. D. Duraiswamy; M. W. Sales (57) ABSTRACT

A logic device for performing a plurality of logic functions employs a plurality of logic elements interconnected by a plurality of switching boxes. A set of configuration bits are provided to the logic. The configuration bits represent a logic circuit that has been partitioned into two or more contexts. A subset of the configuration bits representing the portion of the logic circuit to be performed is selected by a number of context input lines. Operand bits are also provided to the logic element. By using virtualization registers, the output of a logic element in one context can be used as an input in another context. The output for a logic function is selected by the operands and stored in a register bank in such a way that it may later be retrieved by the context number it is associated with.

21 Claims, 4 Drawing Sheets

OTHER PUBLICATIONS

Andre DeHon, "Transit Note #118 Notes on Coupling Processors with Reconfigurable Logic", MIT Transit Project, Mar. 21, 1995, pp. 1–40.

Ralph D. Wittig, "OneChip: An FPGA Processor With Reconfigurable Logic", M.A.Sc. Thesis Oral Presentation, University of Toronto, Department of Electrical & Computer Engineering, Sep. 1995, pp. 1–21.

* cited by examiner

METHOD AND APPARATUS FOR SELECTIVELY PERFORMING A PLURALITY OF LOGIC OPERATIONS AND MEMORY FUNCTIONS

TECHNICAL FIELD OF THE INVENTION

The present invention relates generally to reconfigurable computing systems, and more particularly to a method for performing a plurality of logic operations through programmable logic virtualization.

BACKGROUND OF THE INVENTION

Logic circuits are commonly used to perform a multitude of functions in electronic products, such as pattern recognition, communication, compression/decompression, encryption, and network protocol processing. As the complexity of these functions increases, so does the size and cost of the logic circuits needed to perform them.

Programmable logic devices are well suited for many applications as they can be reprogrammed to perform several different tasks. Programmable logic devices commonly consist of an array of logic elements, and the connections and functions of the logic elements are programmable. Once built into a product, they are not typically reprogrammed. Also, although programmable logic devices are flexible, they still suffer from a scalability problem. As the complexity of the functions they are required to perform increases, the number of logic elements in the array must increase, thereby increasing the size and cost of the device. After a certain point, more than one device is typically required thereby further increasing size and cost.

SUMMARY OF THE INVENTION

A logic device for performing a plurality of logic functions by sharing limited logic resources over time is described. Multiple contexts are created to facilitate the resource sharing, and special registers are used to allow key data to persist between context switches.

In accordance with a first aspect of the invention, a method for performing a plurality of logic operations, is provided. The method comprises the steps of providing a first context number. The method further comprises the step of providing a set of configuration bits and selecting a first subset of the configuration bits based on the first context number. Still further, the method comprises providing a first operand combination and selecting a first member of the first subset of the configuration bits based on the first operand combination. Additionally, the method comprises storing the first member of the first subset of the configuration bits in a memory, wherein the first member of the first subset of the configuration bits is associated with the first context number.

In some preferred embodiments, the plurality of logic operations is partitioned into two or more contexts, wherein each context represents a portion of a logic circuit. In other preferred embodiments, the set of configuration bits represents a logic circuit, wherein the set of configuration bits represents a collection of possible outputs for a logic function. In still other preferred embodiments, the set of configuration bits may be provided by retrieving the bits from a memory.

In some embodiments, the first subset of the configuration bits represents a portion of a logic circuit and/or a collection of possible outputs for a logic function. In certain embodiments, the method further comprises the step of providing a second context number. In such an instance the second context number is associated with a representation of a portion of a logic circuit. In such an embodiment, some portion of the first operand combination may be provided by retrieving a stored member of a second subset of the configuration bits. Further, the second subset of the configuration bits represents a portion of a logic circuit and/or a collection of possible outputs for a logic function. Still further in such an instance, the stored member of the second subset of the configuration bits may represent an output of a logic function.

In other embodiments, the first operand combination is provided by selecting a second member of the first subset of the configuration bits based on a second operand combination. In such an instance, the second operand combination may be provided by retrieving a stored member of a subset of the configuration bits and/or the second operand combination may be provided by selecting a member of a subset of the configuration bits. Further, the second operand combination preferably represents a particular combination of inputs to a logic function and the second member of the first subset of the configuration bits preferably represents an output of a logic function. In some embodiments, the first operand combination represents a particular combination of inputs to a logic function. In other embodiments, the first member of the first subset of the configuration bits represents an output of a logic function.

In accordance with another aspect of the present invention, an apparatus for performing a plurality of logic operations is provided. The apparatus comprises a selector for selecting a subset of a set of configuration bits and for selecting a member of the subset of the configuration bits, wherein the subset of the set of configuration bits is selected based on a context number and the member of the subset of the configuration bits is selected based on an operand combination and a memory device for storing the set of configuration bits and for storing the member of the subset of the configuration bits.

In some preferred embodiments the selector comprises a multiplexer. In other embodiments the selector comprises a first multiplexer coupled to a second multiplexer. In certain embodiments the memory device comprises a static random access memory (SRAM) and/or a bank of registers.

BRIEF DESCRIPTION OF THE DRAWINGS

These and other features and advantages of the present invention will become more apparent from a detailed consideration of the following detailed description of certain preferred embodiments when taken in conjunction with the drawings in which.

DETAILED DESCRIPTION OF THE PREFERRED EMBODIMENTS

Although for simplicity of explanation the following description focuses primarily on a relatively small logic circuit with very few operands and only two contexts, persons of ordinary skill in the art will readily appreciate that the techniques of the present invention are in no way limited to small logic circuits, few operands, or two contexts. On the contrary, any size logic circuit with any number of operands and any number of contexts may employ the techniques shown herein. Further, though for ease of discussion, the following description focuses on a method for performing a plurality of logic functions wherein first and second subsets of configuration bits and first and second members of subsets are used to perform the logic functions. Persons of ordinary skill in the art will appreciate that any number of subsets of configuration bits and any number of members of subsets may be employed without departing from the scope of the present invention.

Figure 1:
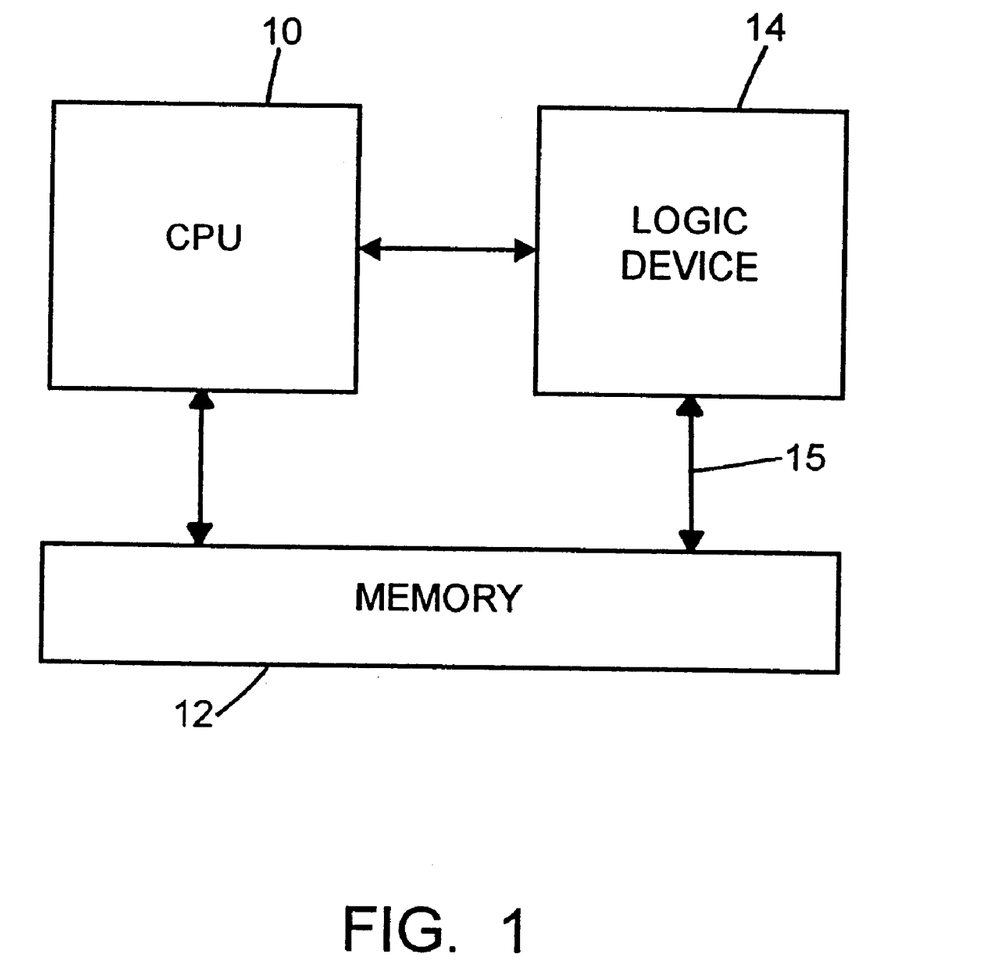
FIG. 1 is a block diagram of a system employing a logic device in accordance with one embodiment of the invention.

A representative electrical system capable of utilizing the teachings of the present invention is shown in FIG. 1. A central processing unit (CPU) 10 is coupled to a memory device 12 for performing common software driven computing tasks. The memory device 12 may be an array of static random access memory (SRAM) cells, dynamic random access memory (DRAM), read only memory (ROM), FLASH, or any other type of memory or a combination thereof. Each cell of the memory device 12 typically holds binary representations. The CPU 10 is also coupled to a logic device 14 for performing relatively high speed logic functions. In the preferred embodiment of the present invention the logic device 14 is also coupled to the memory device 12 by a memory bus 15 (i.e., plurality of input/output lines) for storing configuration bits.

Figure 2:
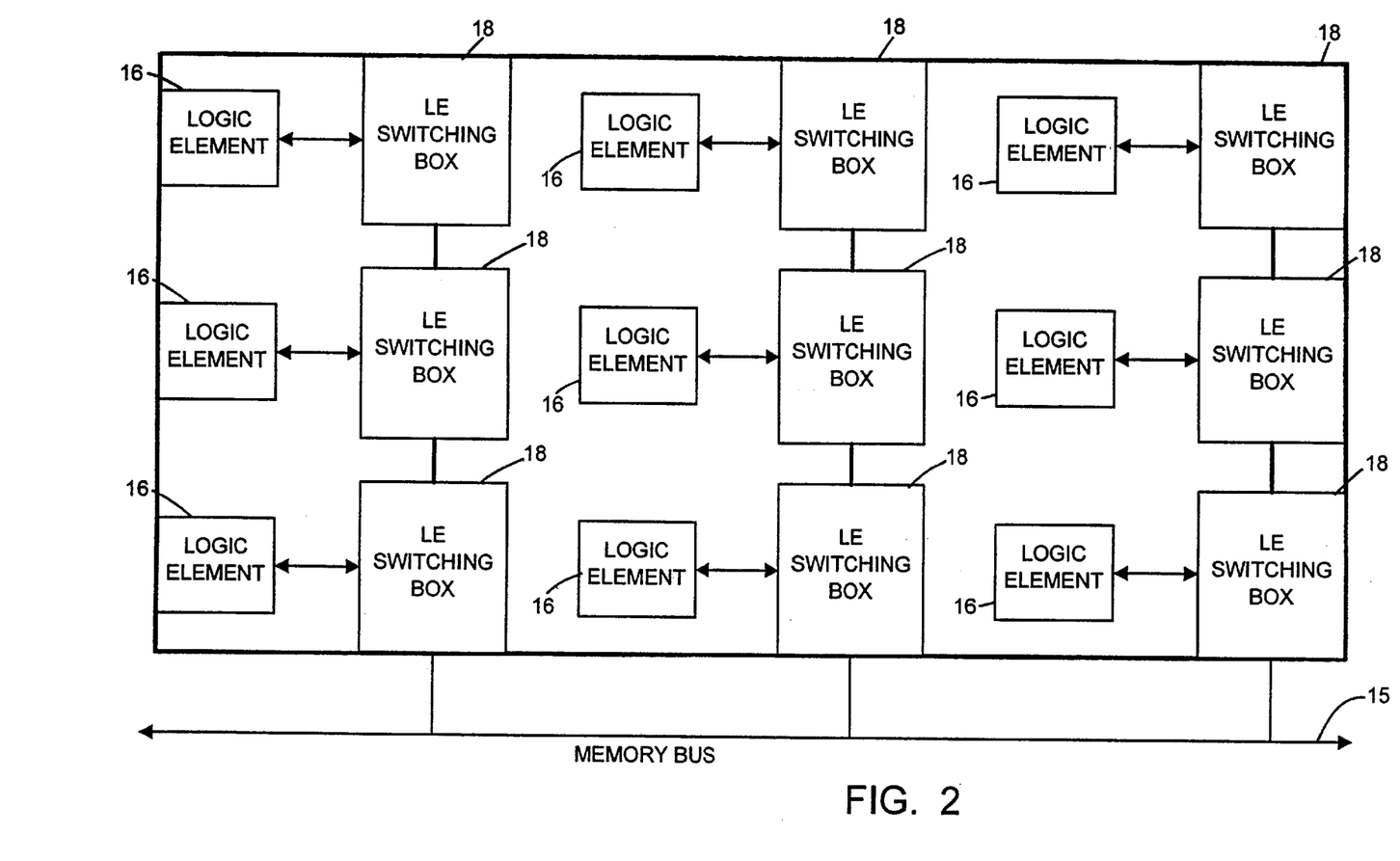
FIG. 2 is a more detailed block diagram of the logic device of FIG. 1.

A more detailed block diagram of the logic device 14 is illustrated in FIG. 2. A plurality of logic elements 16 are interconnected by a plurality of switching boxes 18. Each logic element 16 has a plurality of inputs and at least one output. The inputs carry configuration bits from memory 12 as well as operands from memory 12 and operands form other logic elements 16. The output of each logic element can be routed by the switching boxes 18 to the input (i.e. operand) of any other logic element 16 and/or to the memory bus 15. A single logic element 16 output may go to multiple locations.

Figure 3:
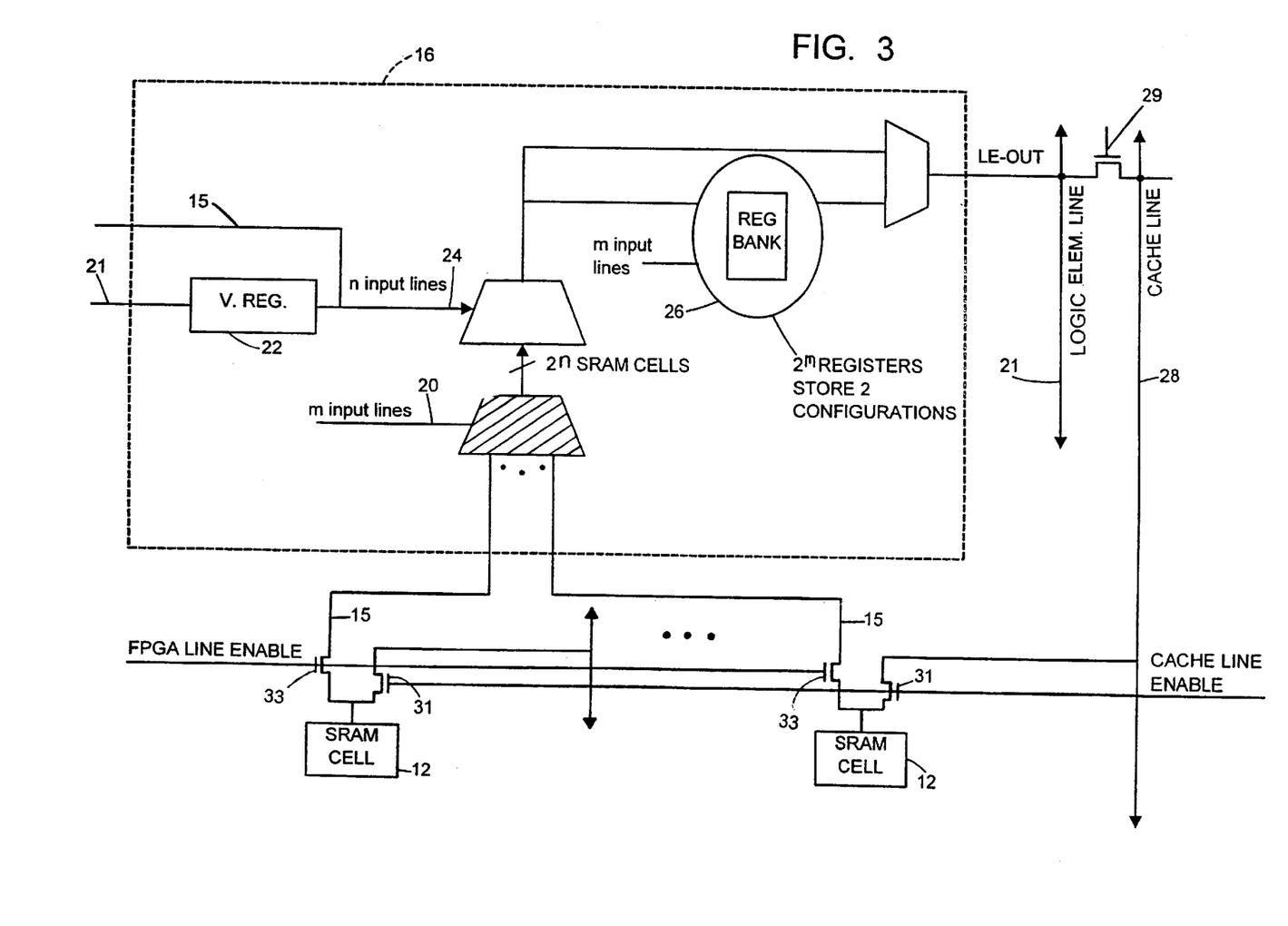
FIG. 3 is a more detailed block diagram of a logic element of FIG. 2 along with pertinent external connections in accordance with the teachings of the present invention; and, FIG. 4 is a flowchart of a program that can be implemented by a circuit to perform a plurality of logic operations in accordance with the teachings of the present invention.

A more detailed block diagram of a single logic element 16 and some of the logic element's 16 external connections are illustrated in FIG. 3. A set of configuration bits are provided to the logic element directly from memory 12 via the memory bus 15 or via a switching box 18 or from any other circuit. The configuration bits represent a logic circuit (i.e. a set of interconnected logic functions). The logic circuit, or some representation of the logic circuit, is preferably partitioned into two or more contexts. The subset of the configuration bits representing the portion of the logic circuit to be performed is selected by a number of context input lines 20. For example, if a logic circuit representation is divided into four portions, there would preferably be two context input lines 20. The four combinations that two logic levels could form on each of two input lines would serve to select one of the four contexts of the example logic circuit representation. A context number is associated with each portion of the logic circuit representation (i.e. subset of configuration bits) and is preferably provided by a typical counter circuit. Alternatively, a context number could be provided by a logic element 16, the CPU 10, or any other circuit. Context selection is preferably performed by a multiplexer (MUX) in a well known manner. Although a context selecting multiplexer is shown in each logic element 16, persons of ordinary skill in the art will readily appreciate that one multiplexer could be used for several logic elements 16. In fact, one multiplexer could be used for all of the logic elements 16.

A combination of operand bits is provided to the logic element directly from memory 12 via the memory bus 15, via a switching box 18, or directly from the output(s) of other logic elements 16 via a logic element output line 21 or from any other circuit. In the event that some portion or all of the operand bits originated at a logic element 16, the bits are preferably stored in virtualization registers 22 to allow logic circuit representations to cross context borders. In other words, by using a virtualization register 22 the output of a logic element 16 in one context can be used as an input (i.e. operand) in another context. Of course the memory device 12 or any other circuit could be similarly used to retain the operands. Further, it will be readily appreciated by persons skilled in the art that the device used to store the operands need not be part of each logic element 16. One device could function as a virtualization register for several or all of the logic elements 16.

A particular combination of operand bits (operand combination) represents a particular combination of inputs to a logic function. The member of the subset of the configuration bits representing the correct output for that portion of the logic circuit (i.e. that particular logic function) given a particular operand combination is selected by a number of operand input lines 24. For example, if a logic function has four possible outputs (i.e., four members in a particular subset of the configuration bits), there would preferably be two operand input lines 24. The four combinations that two logic levels could form on each of two input lines would serve to select one of the four possible outputs of the logic function. Member selection is preferably performed by a multiplexer (MUX) in a well known manner. Although a member selecting multiplexer is shown in each logic element 16, persons of ordinary skill in the art will readily appreciate that one multiplexer could be used for several logic elements 16. In fact, one multiplexer could be used for all of the logic elements 16. Further, the function of selecting a member could be combined with the function of selecting a context.

Once a member is selected it is preferably stored in a memory, such as a register bank 26, in such a way that it may later be retrieved by the context number it is associated with. For example, if there are four contexts, then each of four registers in a logic element 16 could store the logic function output for each of the four contexts. Storing the logic function output (i.e. the member selected) in the register bank 26 allows the output of each logic element to be restored when it is time for that portion of the logic circuit representation (i.e. context) to be performed. Of course the memory device 12 or any other circuit could be similarly used to store the members. Further, it will be readily appreciated by persons skilled in the art that the device used to store the members need not be part of each logic element 16. One device could function as a register bank for several or all of the logic elements 16.

In addition to storing the selected member, in the preferred embodiment the selected member (i.e. the logic function output) is selectively made available to other logic elements 16 and/or external devices and integrated circuits, such as a microprocessor and/or an application specific integrated circuit (ASIC) via a cache output line 28. The logic function output can be selectively connected or disconnected from the cache output line 28 by a logic element cache line switch 29, such as a transistor. Connecting a logic function output to an external cache output line 28 provides increased functionality for systems incorporating logic elements 16 as well as simplicity in logic function debugging processes. It will be readily appreciated by persons of ordinary skill in the art that one cache line switch 29 could route signals to or from multiple sources and destinations. For example a row of logic elements 16 could be selectively connected or disconnected to or from the cache output line 28.

The cells of the memory device 12 can also be selectively connected or disconnected directly to or from the cache output line 28 by an SRAM cache line switch 31. Operation of selected SRAM cache line switches 31 allows SRAM cells to be used by the logic element 16 for configuration bits and/or external devices and integrated circuits, such as a microprocessor and/or an application specific integrated circuit (ASIC) via the cache output line 28. It will be readily appreciated by persons of ordinary skill in the art that one SRAM cache line switch 31 could route signals to or from multiple sources and destinations. For example a row of memory cells 12 could be selectively connected or disconnected to or from the cache output line 28. Optionally, the connection from a memory cell 12 could be disconnected by a SRAM logic element switch 33, particularly when the memory cell 12 is connected to the cache output line 28.

Figure 4:
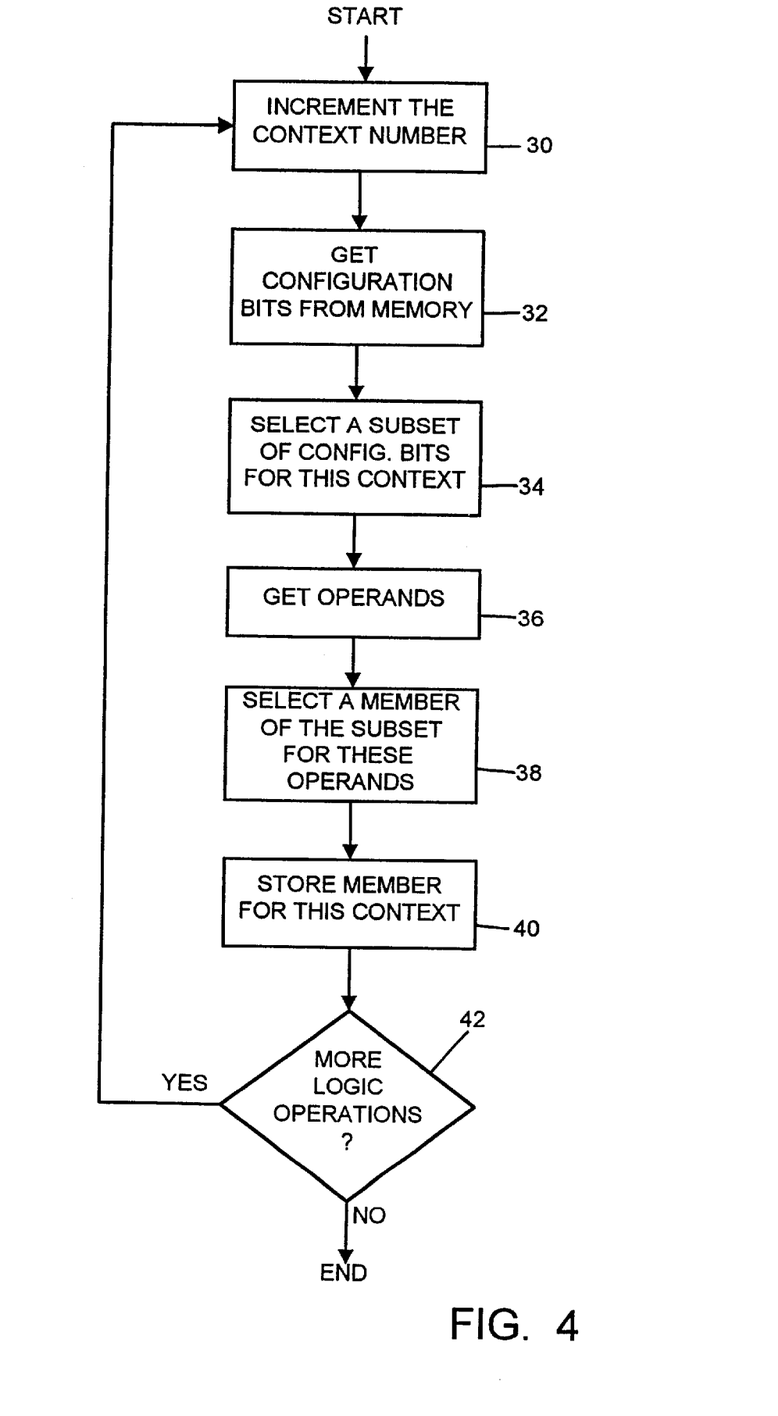

A flow chart of a program that can be implemented to perform a plurality of logic operations in accordance with the teachings of the present invention is illustrated in FIG. 4. The programmed steps may be performed by a control circuit such as the system of FIG. 1 or a similar application specific integrated circuit (ASIC). Once the program is initiated the control circuit provides a first context number or increments an existing context number (block 30). For example, if there are four contexts the control circuit may start with context number 00 and then go to context number 01, followed by context number 10, and then context number 11, subsequently looping around to context number 00. Once a context number is provided, the configuration bits are retrieved from memory. (e.g., SRAM cells) (block 32) in a conventional manner and the subset of the configuration bits associated with the current context number is selected (block 34). This selection could be keyed by relative position in the memory, absolute position in the memory, tags in the memory, or any method of keyed memory retrieval. Operands are then retrieved from their memory (e.g., registers) in a conventional manner (block 36) and the operands are used as a key to select a particular member of the previously selected subset (block 38). Again, this selection could be keyed by relative position in the memory, absolute position in the memory, tags in the memory, or any method of keyed memory retrieval. Once a particular member is selected, it is stored in a memory (e.g., register) (block 40) in manner that it may later be retrieved by keying to the current context number. This could be accomplished by relative position in the memory, absolute position in the memory, tags in the memory, or any method of keyed memory storage. Once a logic operation is complete, the control circuit checks if any more logic operations are necessary (block 42). If more logic operations are necessary the method repeats, if not it may end.

In summary, persons of ordinary skill in the art will readily appreciate that a method for performing a plurality of logic operations through programmable logic virtualization has been provided. Systems implementing the teachings of the invention can enjoy higher computational densities, increased efficiency of memory utilization, and large virtual logic systems on a single chip.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method of storing a first output bit in a memory device based on a first context number, the first output bit resulting from a particular logic function, the method comprising the steps of:

providing configuration data which represent a plurality of logic functions to a programmable logic device;

providing the first context number to the programmable logic device, the first context number being indicative of the particular logic function, the particular logic function being in the plurality of logic functions, providing operand bits representing an input to the particular logic function to the programmable logic device;

selecting the first output bit from the configuration data based on the operand bits and the first context number;

storing to the memory device the first output bit such that the first output bit is retrievable based on the first context number;

providing a second context number to the programmable logic device after the step of storing the first output bit in the memory device;

providing a third context number to the programmable logic device after the step of providing the second context number; and retrieving the first output bit from the memory device based on the first context number after the step of providing the third context number.

2. The method of claim 1, further comprising the steps of:

storing the first output bit in a virtualization register before the step of providing the second context number; and retrieving the first output bit from the virtualization register after the step of providing the second context number.

3. The method of claim 1, wherein the step of providing operand bits representing an input to the particular logic function comprises the step of retrieving another output bit from the memory device based on the first context number.

4. The method of claim 1, wherein the step of providing operand bits representing an input to the particular logic function comprises the step of retrieving a second output bit from the memory device based on a second context number.

5. The method of claim 1, wherein the step of providing configuration data which represent a plurality of logic functions comprises the step of storing a collection of possible outputs for a logic function in the memory device.

6. The method of claim 1, wherein the step of providing the first context number comprises the step of operating a counter circuit to provide an incremented context number.

7. The method of claim 1, wherein the step of providing the first context number comprises the step of providing a non-incremented context number.

8. The method of claim 7, wherein the step of providing the first context number comprises the step of operating a central processing unit to provide a non-incremented context number.

9. The method of claim 1, wherein the step of providing operand bits representing an input to the particular logic function comprises the step of retrieving the operand bits from the memory device.

10. The method of claim 1, wherein the step of providing operand bits representing an input to the particular logic function comprises the step of operating a logic element.

11. The method of claim 1, wherein the step of providing operand bits representing an input to the particular logic function further comprises the step of operating a virtualization register.

12. The method of claim 1, wherein the step of selecting the first output bit from the configuration data based on the operand bits and the first context number comprises the step of operating a multiplexer.

13. The method of claim 1, further comprising the step of making the output bit selected from the configuration data available to a logic element.

14. The method of claim 1, further comprising the step of making the output bit selected from the configuration data available to a microprocessor.

15. An apparatus for performing a plurality of logic operations comprising:

a logic device for performing a plurality of logic function;

a microprocessor for executing software driven computing tasks; and a cache memory device physically merged to the logic device and the microprocessor, a first portion of the cache memory device being used by the logic device to perform the plurality of logic function and to store a first context output bit and a second context output bit such that the first context output bit and the second context output bit are retrievable after a plurality of context numbers have been provided to the logic device, a second portion of the cache memory device being used by the microprocessor for executing the software driven computing tasks.

16. An apparatus as defined in claim 15, wherein the memory device comprises a static random access memory cell.

17. An apparatus as defined in claim 15, wherein the memory device comprises a bank of registers.

18. An apparatus as defined in claim 15, wherein the cache memory device stores an output bit from one of the plurality of logic functions in a manner such that an output bit may be retrieved based on a corresponding context number.

19. A programmable logic device for performing a plurality of logic operations, the programmable logic device comprising:

a selector structured to select a first output bit for a first context and a second output bit for a second context, the first output bit being selected from logic circuit data based on a first operand bit, a second operand bit, and a first context number, the second output bit being selected from the logic circuit data based on a third operand bit, a fourth operand bit, and a second context number, the first context number being different than the second context number; and a memory device storing the logic circuit data, the first output bit, and the second output bit, the memory device storing the logic circuit data in at least two logical partitions, the memory device storing the first output bit in a manner such that the first output bit is retrievable based on the first context number, the memory device storing the second output bit in a manner such that the second output bit is retrievable based on the second context number after a plurality of context numbers are provided to the programmable logic device.

20. A programmable logic device as defined in claim 19, wherein the selector comprises a multiplexer.

21. A programmable logic device as defined in claim 19, wherein the selector comprises a first multiplexer coupled to a second multiplexer.

* * * * *

UNITED STATES PATENT AND TRADEMARK OFFICE
CERTIFICATE OF CORRECTION

PATENT NO.    : 6,367,063 B1                                      Page 1 of 1
DATED         : April 2, 2002
INVENTOR(S)   : David A. Schwartz et al.

It is certified that error appears in the above-identified patent and that said Letters Patent is hereby corrected as shown below:

<u>Title page,</u>
Item [12], United States Patent Harding et al." should read -- [12], United States Patent Schwartz et al. --;
Item [75], Inventors, "John A. Harding, Pico Rivera; David A. Schwartz, Moorpark; Lap-Wai Chow, South Pasadena, all of CA (US)" should read -- [75] Inventors, David A. Schwartz, Moorpark; John A. Harding, Pico Rivera; Lap-Wai Chow, South Pasadena, all of CA (US) --.

<u>Column 5,</u>
Line 35, delete "." after "are retrieved from memory" and before "(e.g., SRAM cells)".

<u>Column 7,</u>
Lines 15-31, "plurality of logic function" should read -- plurality of logic functions --, and
Line 23, "plurality of logic function" should read -- plurality of logic functions --.

Signed and Sealed this

Twenty-fourth Day of September, 2002

Attest:

Attesting Officer

JAMES E. ROGAN
*Director of the United States Patent and Trademark Office*